United States Patent [19]
Okabe et al.

[11] Patent Number: 5,791,043
[45] Date of Patent: Aug. 11, 1998

[54] PROCESS OF PRODUCING METAL CATALYST CARRIER

[75] Inventors: Shinichi Okabe; Tokio Kohama, both of Nishio; Tohru Yoshinaga, Okazaki; Kiyohiko Watanabe, Okazaki; Yasuyuki Kawabe, Okazaki, all of Japan

[73] Assignee: Nippondenso Co., Ltd., Kariya, Japan

[21] Appl. No.: 651,937

[22] Filed: May 21, 1996

[30] Foreign Application Priority Data

May 22, 1995 [JP] Japan .................... 7-122410

[51] Int. Cl.$^6$ .................... B23P 15/00
[52] U.S. Cl. .................... 29/890; 228/181; 156/209
[58] Field of Search .................... 29/890; 228/181; 156/191, 192, 205, 210

[56] References Cited

U.S. PATENT DOCUMENTS

| | | |
|---|---|---|
| 4,152,302 | 5/1979 | Nonnenmann et al. . |
| 4,741,082 | 5/1988 | Kanniainen et al. .................... 29/890 |
| 4,824,011 | 4/1989 | Maus et al. .................... 29/890 |
| 4,923,109 | 5/1990 | Cyron .................... 29/890 |
| 4,987,034 | 1/1991 | Hitachi et al. . |
| 5,278,125 | 1/1994 | Iida et al. . |
| 5,402,928 | 4/1995 | Preston et al. .................... 228/181 |

FOREIGN PATENT DOCUMENTS

| | | |
|---|---|---|
| 61-199574 | 9/1986 | Japan . |
| 63-185627 | 8/1988 | Japan . |

*Primary Examiner*—Irene Cuda
*Attorney, Agent, or Firm*—Cushman, Darby & Cushman IP Group of Pillsbury Madison & Sutro LLP

[57] ABSTRACT

To enable bonding flat and corrugated sheets at their contact points by laser welding or other welding methods while laminating and spirally winding the sheets, a process of producing a metal catalyst carrier for exhaust gas purification in the form of a metal honeycomb column composed of flat and corrugated metal sheets alternately laminated, wound together, and bonded to each other, the process includes the steps of: forming plural openings in a flat sheet of a metal; laminating one piece of the flat sheet having the openings formed therein and one piece of a corrugated sheet of a metal and bonding the laminated flat and corrugated sheets to each other to form a composite sheet; and spirally winding the composite sheet around an axis to form columnar turns each composed of an outer flat layer composed of the flat sheet and an inner corrugated layer composed of the corrugated sheet, while bonding an outer turn and an adjoining inner turn by welding an inner corrugated layer of the outer turn, in a portion exposed in one of the openings of an outer flat layer of the outer turn, to an outer flat layer of the adjoining inner turn through said one of the openings to bond the outer turn and the adjoining inner turn.

4 Claims, 6 Drawing Sheets

PROCESS OF PRODUCING METAL CATALYST CARRIER

BACKGROUND OF THE INVENTION

1. Field of the Invention

The present invention relates to a process of producing a metal catalyst carrier for exhaust gas purification.

2. Description of the Related Art

A known metal catalyst carrier for exhaust gas purification comprises a metal honeycomb column composed of flat and corrugated metal sheets or foils laminated and wound together to define numerous parallel through holes, or exhaust gas flow paths, divided by the flat and corrugated sheets; and a metal columnar case fittingly enclosing and fixing the honeycomb column.

In the honeycomb column, the flat and corrugated sheets are not yet bonded to each other.

To bond the flat and corrugated sheets of the honeycomb column, Japanese Unexamined Patent Publication (Kokai) No. 61-199574 discloses a soldering process and Japanese Unexamined Patent Publication (Kokai) No. 63-185627 discloses a laser welding process.

However, the soldering process disclosed in Japanese Unexamined Patent Publication (Kokai) No. 61-199574 has a problem that chemical reaction of the flat or corrugated metal sheets occurs at an elevated temperature during soldering and the heat resistant of the sheets is decreased.

The laser welding process of Japanese Unexamined Patent Publication (Kokai) No. 63-185627 has also a problem that it is very difficult to weld the flat and corrugated sheets at their contact points while laminating and spirally winding the sheets.

SUMMARY OF THE INVENTION

The object of the present invention is to provide a process of producing a metal catalyst carrier for exhaust gas purification, which enables bonding flat and corrugated sheets at their contact points by laser welding or other welding methods while laminating and spirally winding the sheets.

According to the first invention, a composite sheet is prepared by laminating and bonding a flat sheet having openings formed therein and a corrugated sheet and adjoining turns of the composite sheet being spirally wound can be welded through the openings while spirally winding the composite sheet.

According to the second invention, a composite sheet is prepared by disposing plural short flat sheets side by side at a space therebetween on a corrugated sheet and bonding the flat sheets and the corrugated sheet, and adjoining turns of the composite sheet being spirally wound can be welded through the openings while spirally winding the composite sheet.

In the afore-mentioned conventional processes, a honeycomb column is composed of flat and corrugated sheets, which are merely laminated and spirally wound but are not yet bonded to each other, and the unbounded flat and corrugated sheets of the honeycomb column are then bonded by soldering or laser welding to complete a monolithic honeycomb column.

The present invention prepares, in advance, a composite sheet composed of flat and corrugated sheets laminated and bonded together and bonds adjoining turns of the composite sheet being spirally wound while spirally winding the composite sheet, so that an extremely high productivity is achieved.

DESCRIPTION OF THE PREFERRED EMBODIMENTS

The present invention will now be further described in detail by way of examples.

Figure 1:
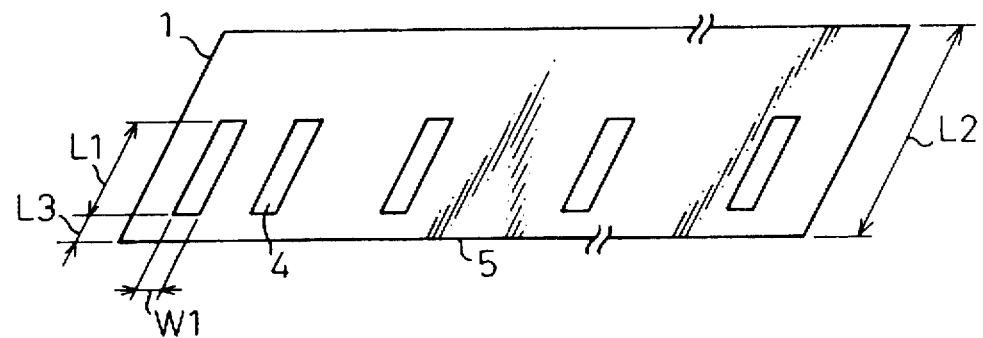
FIG. 1 is a perspective view showing a thin flat sheet having openings beforehand formed therein in Example 1 according to the first invention.
Figure 2:
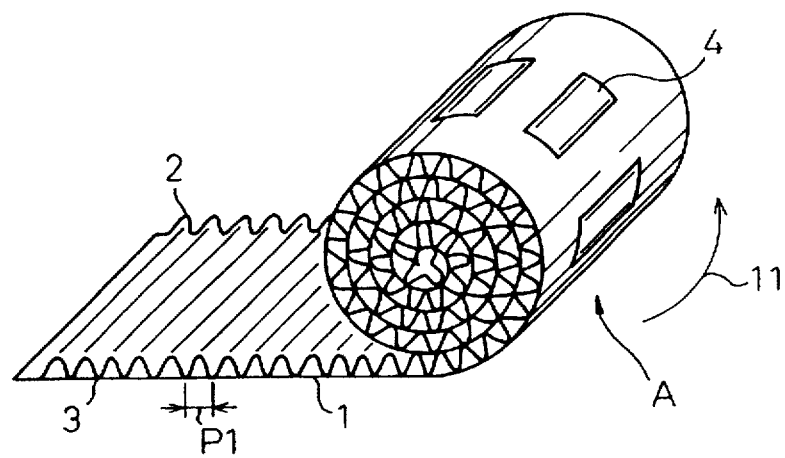
FIG. 2 is a perspective view showing the step of spirally winding a composite sheet composed of the flat sheet having the openings and a corrugated sheet, forming columnnar turns of the composite sheet.

In a typical embodiment of the present invention, for example, in the first invention, a thin flat metal sheet 1 having openings 4 as shown in FIG. 1 is laminated and bonded to a thin corrugated metal sheet 2 to prepare a flat-corrugate composite sheet 3, which is then spirally wound as shown in FIG. 2 while the adjoining winding turns of the composite sheet 3 are bonded to each other by laser welding or other welding methods through the openings 4 to form a monolithic honeycomb column.

Working examples according to the present invention will be described below.

EXAMPLE 1

According to the first invention, a thin flat metal sheet 1 as shown in FIG. 1 and a thin corrugated metal sheet 2 as shown in FIG. 2 are provided. The flat sheet 1 has openings 4 having a length L1 of 20 mm and a width W1 of 5 mm. The length L1 of the openings 4 is 40% of the width or lateral length L2 (for example. 50 mm) of the flat sheet 1 and the width W1 of the openings 4 is twice the pitch P1 (a peak-to-peak or bottom-to-bottom interval, for example, 2.5 mm) of the corrugated sheet 2. The openings 4 are located at a distance L3 (for example, 5 mm) from one end 5 (the lower end in FIG. 1) of the flat sheet 1.

Figure 3:
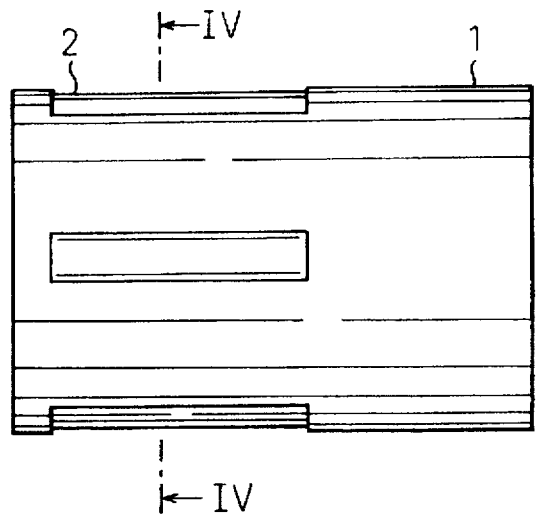
FIG. 3 is a front elevation of the wound column shown in FIG. 2, viewed along the arrow "A"

The flat sheet 1 and the corrugated sheet 2 are then bonded together by laser welding to form a composite sheet 3, which is then spirally wound in the sense as denoted by arrow 11 to form columnar turns of the composite sheet 3 as shown in FIG. 2. FIG. 3 is a front elevation of the columnar turns viewed in the direction shown by arrow A of FIG. 2 and FIG. 4 is a cross-sectional view along line IV—IV of FIG. 3.

Figure 4:
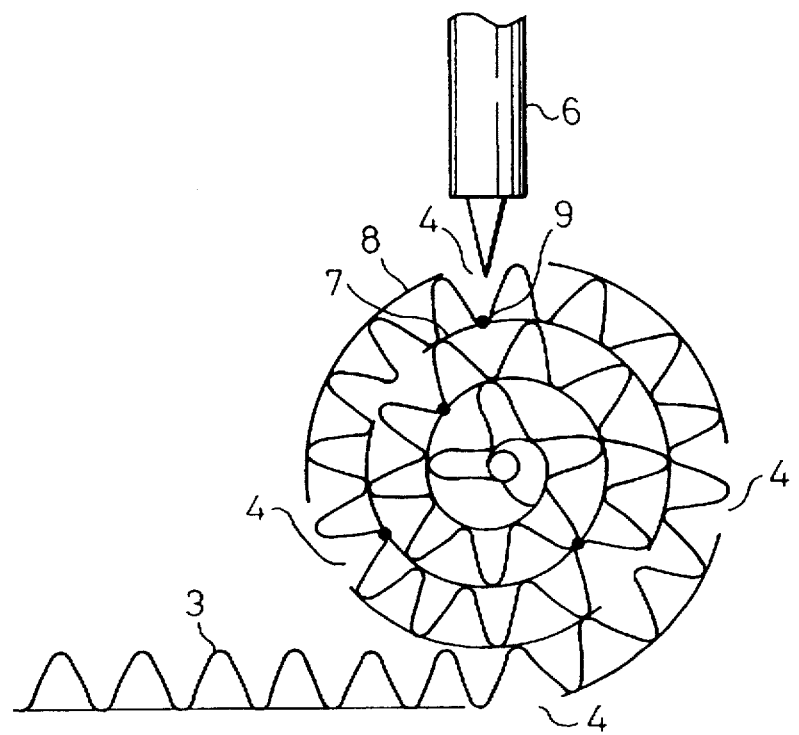
FIG. 4 is a cross-sectional view along the line IV—IV of FIG. 3.

As shown in FIG. 4, while the composite sheet 3 is spirally wound, an inner winding turn 7 and an adjoining outer winding turn 8 are bonded by a laser welder 6 through the opening 4 at a bonding point 9 over a distance of 25 mm along the axis of the column of the winding turns. Because the opening 4 has a width W1 which is twice as large as the pitch P1 of the corrugated sheet 2, a laser beam from the laser welder 6 can always bond the inner winding turn 7 and the outer winding turn 8 through the opening 4. When producing a honeycomb column having an outer diameter of 86 mm, for example, 120 of the bonding points 9 may be equally distributed along the spiral of the wound composite sheet 3.

Figure 5:
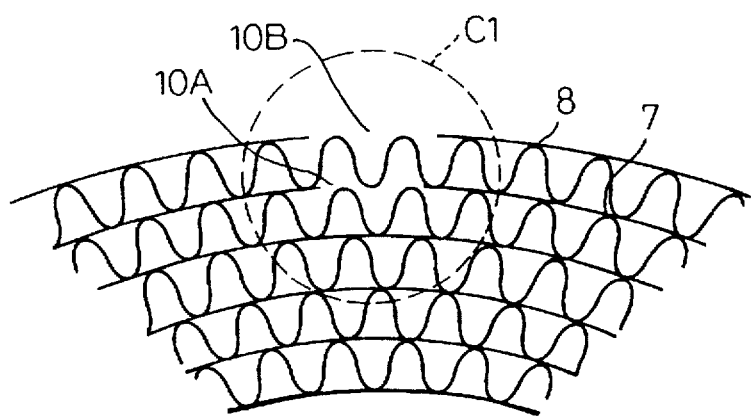
FIG. 5 is an enlarged partial cross-sectional view of a composite sheet being spirally wound to form columnar turns.

The openings 4 must be positioned in the flat sheet 1 in an arrangement which avoids overlap between two openings 10A and 10B of inner and outer winding turns as shown in FIG. 5, because such overlap would cause an absence of the bonding point 9 for the inner winding turn 7 and the outer winding turn 8 in the bonding region C1.

As described above, the present invention provides and advantageous effect that a metal catalyst carrier can be produced at an extremely improved productivity because the provision of the openings 4 in the flat sheet 1 enables the inner and adjoining outer turns of the composite sheet or the bonded laminate of the flat sheet 1 and the corrugated sheet 2 to be bonded by laser welding while the composite sheet is being spirally wound to fabricate a honeycomb column.

The length L1 of the opening 4 is not necessarily limited to 40% of the length L2 of the flat sheet 1 but may be of any other percentage of the latter. When the length L1 of the opening 4 is small, the number of the bonding point 9 may be increased to compensate for the small bonding length because of the small length L1.

Although Example 1 uses laser welding to effect bonding, spot welding, seam welding, or other welding methods may be used to provide the same advantageous effect of the present invention as obtained by the use of laser welding.

EXAMPLE 2

Also according to the first invention, a honeycomb column is produced in the same manner as in Example 1, except for the following points.

Figure 6:
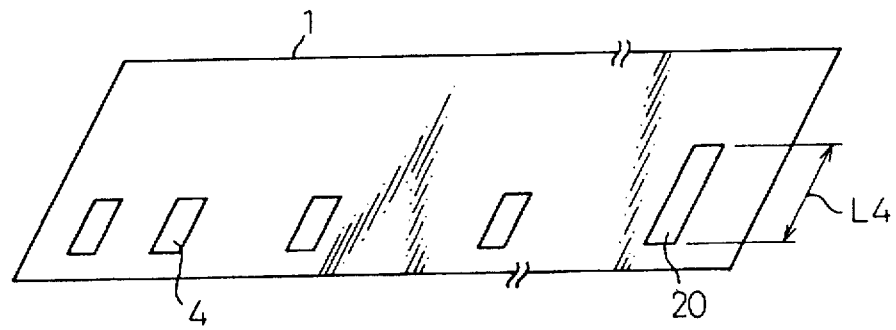
FIG. 6 is a perspective view showing a thin flat sheet having openings beforehand formed therein in Example 2 according to the first invention.

A flat sheet 1 is provided with openings 4 as in Example 1 except that, as shown in FIG. 6, opening 20 has a length L4 greater than the length L1 of other openings 4. Because of the structural nature, a metal catalyst carrier is more likely to break in the outer portion than in the inner portion. Therefore, the opening 20 which will be located in the outer portion of a honeycomb column is provided with a length L4 greater than those of other openings 4 to provide a longer welding joint.

This provides an additional advantage that a honeycomb column is reinforced in the outer portion which is structurally weak, other than the above-described advantageous effect obtained by the embodiment of Example 1.

EXAMPLE 3

According to the second invention, a honeycomb column is produced in the same manner as in Example 1, except for the following points.

Figure 7:
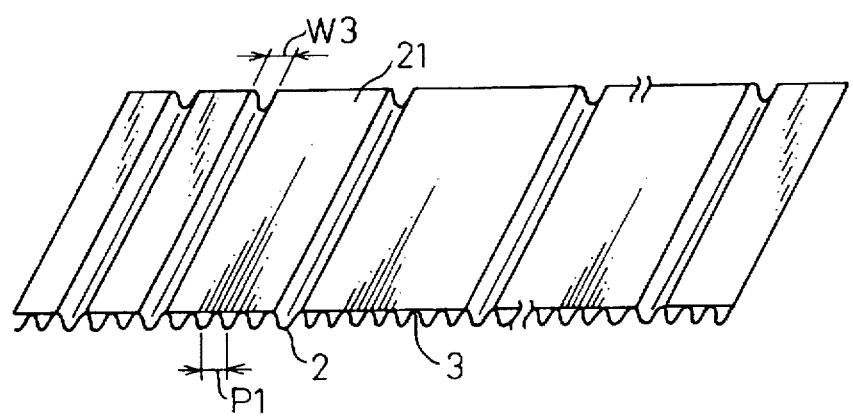
FIG. 7 is a perspective view showing plural short flat sheets disposed side by side at a space therebetween on a corrugated sheet and the flat sheets and the corrugated sheet are bonded together in Example 3 according to the second invention.

As shown in FIG. 7, instead of forming openings, short cut pieces of plural flat sheets 21 are disposed side by side at a space therebetween on a corrugated sheet 2 and bonded to the latter to form a flat-corrugate composite sheet 3. The space between neighboring flat sheets 21 may be equal to the pitch P1 of the corrugated sheet 2. While being spirally wound, the thus-prepared composite sheet 3 is bonded between adjoining winding turns to form a honeycomb column.

This embodiment provides the same advantage as obtained by the embodiment of Example 1.

EXAMPLE 4

According to the first invention, a honeycomb column is produced in the same manner as in Example 1, except for the following points.

Figure 8:
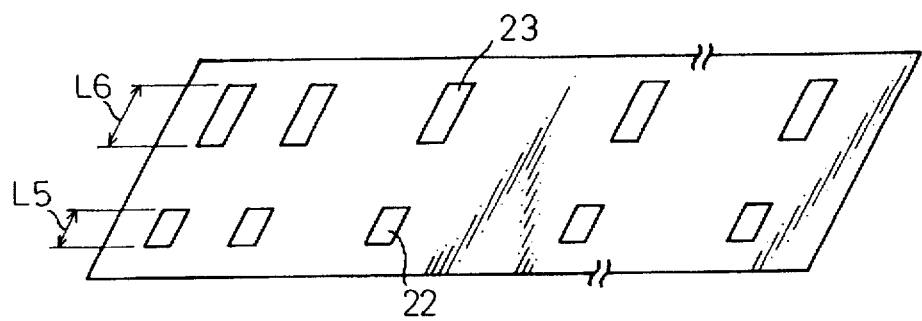
FIG. 8 is a perspective view showing a flat sheet having openings, with every two of the openings being aligned along the width of the sheet, which corresponds to the axis direction of a completed honeycomb column in Example 4 according to the first invention.

As shown in FIG. 8, a flat sheet 1 is provided with openings 22 and 23 like the openings 4 of Example 1, except that two openings 22 and 23 having smaller lengths L5 of 10 mm and L6 of 15 mm, respectively, are provided along the axis of a honeycomb column to be produced, thereby dividing the welding line into two separate segments along the column axis.

Figure 9:
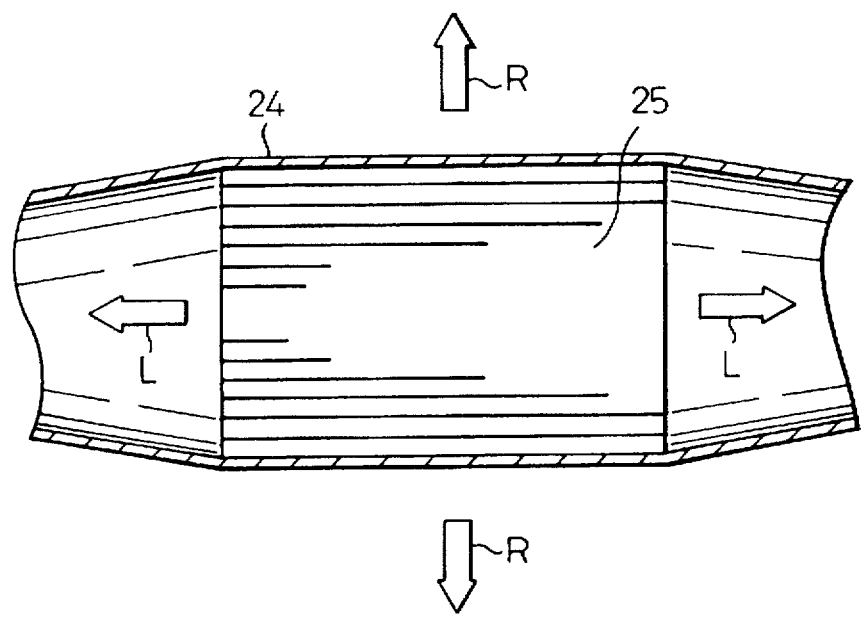
FIG. 9 is a cross-sectional view showing a metal catalyst carrier according to the present invention, which is assembled in an exhaust pipe of an internal combustion engine.

This embodiment is advantageous because, as shown in FIG. 9, possible thermal stresses due to radial and axial expansions R and L are mitigated when a metal catalyst carrier is assembled in an exhaust pipe 24 of an internal combustion engine. This thermal stress mitigation effect will be more significant as a honeycomb column has a greater axial length.

This provides an additional advantage that a honeycomb column has an improved durability, other than the aforementioned advantageous effect obtained by the embodiment of Example 1.

EXAMPLE 5

Figure 10:
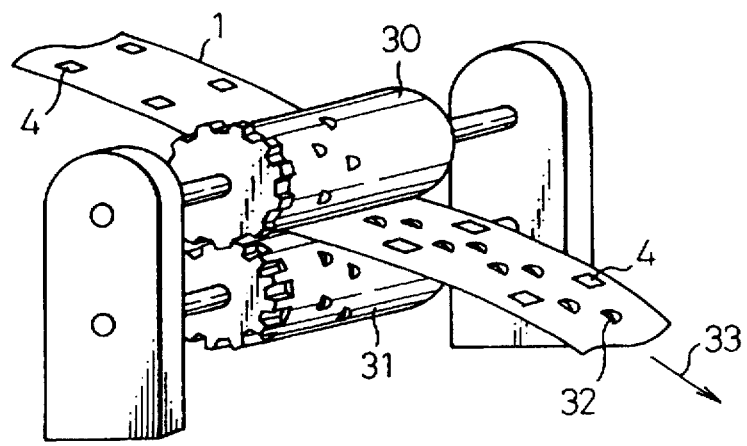
FIG. 10 is a perspective view showing a flat sheet having openings, which is subjected to a roller forming process to form louvers for generating an exhaust gas turbulence in Example 5 according to the first invention.

As shown in FIG. 10, like in Example 4, a flat sheet 1 is provided with two openings disposed along the axis of a honeycomb column to be produced.

The flat sheet 1 is then roller-formed by being directed between upper and lower forming rollers 30 and 31 having forming die and punch, respectively, under a tension in the direction of arrow 33 to form louvers 32 for generating a turbulent flow of exhaust gas.

Figure 11A:
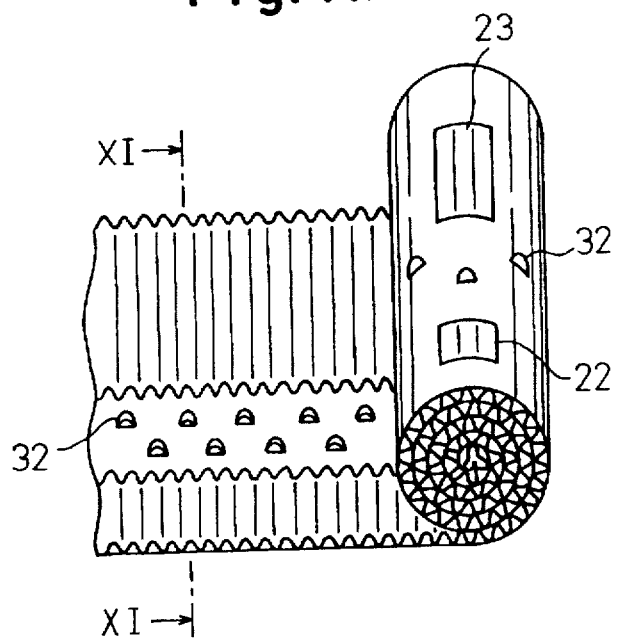
FIGS. 11A and 11B show the step of preparing a composite sheet by laminating and bonding the flat sheet shown in FIG. 10 and a corrugated sheet, in FIG. 11A a perspective view and FIG. 11B a cross-sectional view along the line XI—XI.
Figure 11B:
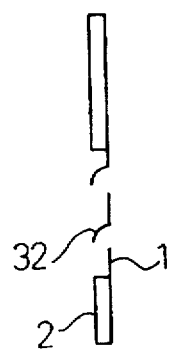

Next, as shown in FIGS. 11A and 11B, the flat sheet 1 is bonded to a corrugated sheet 2 to form a composite sheet, which is then wound while adjoining winding turns are bonded by welding as in Example 1 to form a honeycomb column.

Figure 12:
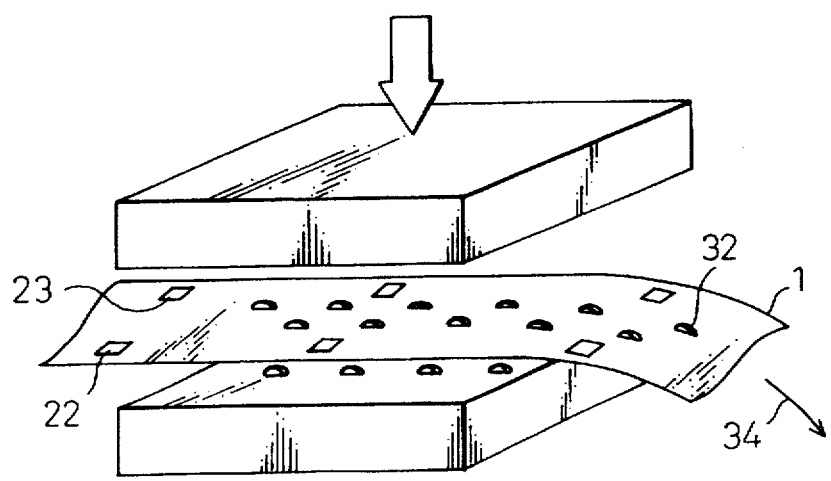
FIG. 12 is a perspective view showing a flat sheet having openings, which is subjected to a press forming process to form louvers for generating an exhaust gas turbulence in Example 5 according to the first invention.

The louvers 32 may be formed by press as shown in FIG. 12 in which the flat sheet 1 is transferred at a given pitch in the direction of arrow 34.

Even when a metal catalyst carrier has a special structure such as louvers as described above, the provision of openings in a flat sheet enables a honeycomb column to be easily produced by spirally winding a flat-corrugate composite sheet.

As herein described above, the present invention extremely improves the productivity of a metal catalyst carrier by spirally winding a composite sheet, or a bonded laminate, of flat and corrugated sheets while bonding adjoining winding turns of the composite sheet.

We claim:

1. A process of producing a metal catalyst carrier for exhaust gas purification in the form of a metal honeycomb column composed of flat and corrugated metal sheets alternately laminated, wound together, and bonded to each other, the process comprising the steps of:

forming plural openings in a flat sheet of a metal;

laminating one piece of the flat sheet having the openings formed therein and one piece of a corrugated sheet of a metal and bonding the laminated flat and corrugated sheets to each other to form a composite sheet; and spirally winding the composite sheet around an axis to form columnar turns each composed of an outer flat layer composed of the flat sheet and an inner corrugated layer composed of the corrugated sheet, while bonding an outer turn and an adjoining inner turn by welding an inner corrugated layer of the outer turn, in a portion exposed in one of the openings of an outer flat layer of the outer turn, to an outer flat layer of the adjoining inner turn through said one of the openings to bond the outer turn and the adjoining inner turn.

2. A process according to claim 1, wherein the plural openings have the same size and the same shape.

3. A process according to claim 1, wherein the step of forming the plural openings comprises:

forming the plural openings greater in size in a region of the flat sheet that forms an outer portion of the honeycomb column than in a region of the flat sheet that forms an inner portion of the honeycomb column.

4. A process of producing a metal catalyst carrier for exhaust gas purification in the form of a metal honeycomb column composed of flat and corrugated metal sheets alternately laminated, wound together, and bonded to each other, the process comprising the steps of:

disposing plural short flat sheets of a metal side by side at a space therebetween on one piece of a corrugated sheet of a metal and bonding the flat sheets and the corrugated sheet to form a composite sheet;

spirally winding the composite sheet around an axis to form columnar turns each composed of an outer flat layer composed of the flat sheet and an inner corrugated layer composed of the corrugated sheet, while bonding an outer turn and an adjoining inner turn by welding an inner corrugated layer of the outer turn, in a portion exposed in one of the openings of an outer flat layer of the outer turn, to an outer flat layer of the adjoining inner turn through said one of the openings to bond the outer turn and the adjoining inner turn.

* * * * *

UNITED STATES PATENT AND TRADEMARK OFFICE
CERTIFICATE OF CORRECTION

PATENT NO. : 5,791,043
DATED : August 11, 1998
INVENTOR(S) : OKABE, et al

It is certified that error appears in the above-identified patent and that said Letters Patent is hereby corrected as shown below:

--[73] Assignee: Nippon Soken, Inc., Nishio-shi, Japan--

Signed and Sealed this

Twenty-seventh Day of June, 2000

Attest:

Q. TODD DICKINSON

*Attesting Officer*     *Director of Patents and Trademarks*